Patented Sept. 26, 1950

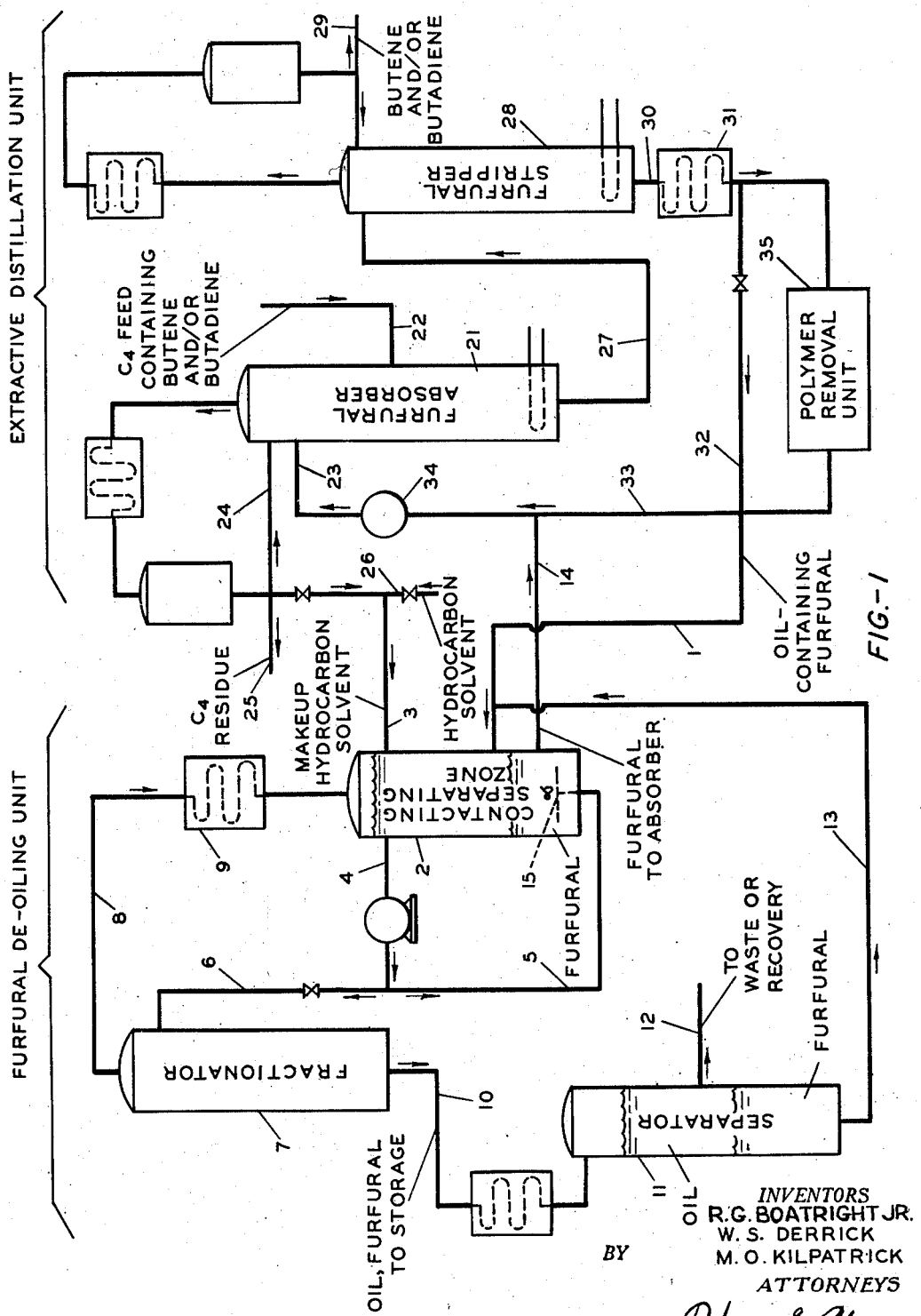

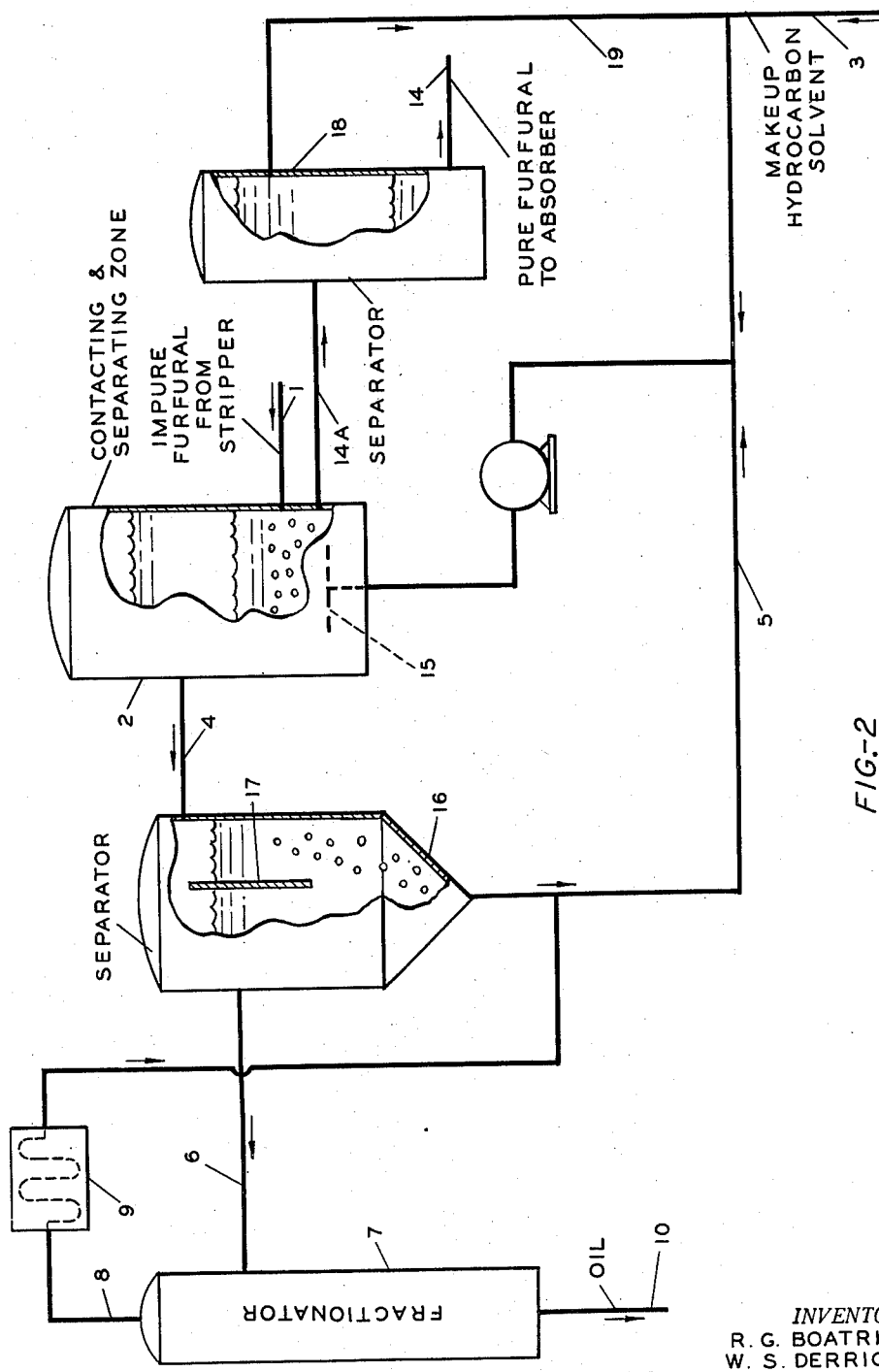

2,523,554

UNITED STATES PATENT OFFICE 2,523,554

FURFURAL PURIFICATION

Robert G. Boatright, Jr., and Myron O. Kilpatrick, Borger, Tex., and William S. Derrick, Guymon, Okla., assignors to Phillips Petroleum Company, a corporation of Delaware Application February 16, 1945, Serial No. 578,312

5 Claims. (Cl. 260—347)

This invention relates to purification of furfural and more particularly furfural which has been used in hydrocarbon selective solvent extraction processes, especially in those processes wherein normal butene and/or butadiene are recovered from more saturated $C_4$ hydrocarbons by extractive distillation and thereby contaminated with foam producing impurities.

In the extractive distillation of hydrocarbon streams with furfural as a solvent, and especially in the extractive distillation to recover normal butene and/or butadiene from $C_4$ hydrocarbon streams containing the same in the manner disclosed in the copending applications of K. H. Hachmuth, Serial No. 438,844, filed April 13, 1942, which issued January 20, 1948, as Patent No. 2,434,796, and Serial No. 454,312, filed August 10, 1942, which issued January 28, 1947, as Patent No. 2,415,006, the furfural solvent gradually becomes contaminated with foam producing impurities which are picked up or formed from the hydrocarbon stream being extracted. While the exact nature of these foam producing materials is not known with certainty, they may consist of heavy hydrocarbons, esters and other related compounds. The rerunning of the furfural to remove polymer in accordance with U. S. Patents 2,350,584 and 2,350,609, assigned to the assignee of the present invention, does not effect removal of the foam producing substances. Presumably this is because the foaming oils, impurities and/or oil-furfural azeotropes (if such azeotropes are formed) boil below or substantially at the boiling point of pure furfural or furfural containing the limited amount of water commonly employed. When the concentration of the foam producing substances exceeds certain limits the furfural foams excessively in the extractive distillation and solvent stripping steps. This results in inefficient extraction and carry-over of solvent into the hydrocarbon overhead products of these steps.

In the copending application of Thodos and Weinaug, Serial No. 546,371, filed July 24, 1944, which issued January 14, 1947, as Patent No. 2,414,412, there is disclosed a process of removing the foaming oils from furfural contaminated therewith by subjecting the furfural to liquid-liquid extraction with a hydrocarbon solvent which is immiscible with furfural such as a paraffin hydrocarbon having from three to eight carbon atoms per molecule.

The principal object of the present invention is to provide an improved method of removing the foam producing impurities from the furfural in a simple and economical manner. Another object is to accomplish the removal with a minimum of additional equipment and processing steps. Another object is to accomplish the removal in such manner as to require a minimum of additional supervision and control. Another object is to provide a de-oiling process which is especially adapted to be used in conjunction with the extractive distillation system. Another object is to provide a process which is applicable to a sidestream of lean furfural from the stripper to effect removal of foaming oils to such an extent as to keep the oil concentration in the furfural in the main extractive distillation system at a level such that satisfactory operation thereof is assured. Numerous other objects will more fully hereinafter appear.

The accompanying drawing: Fig. 1 portrays diagrammatically one arrangement of equipment which has been empolyed in a butadiene plant and been found very satisfactory in carrying out the present invention. Fig. 2 portrays a modified de-oiling unit which may be employed in place of that shown in Fig. 1.

In accordance with the present invention, foam-producing impurities are removed from the furfural by passing a sidestream of the lean furfural to a contacting and separating zone which embodies an upper hydrocarbon solvent phase and a lower furfural phase. As the hydrocarbon solvent, we may use any hydrocarbon which is immiscible with furfural and which is a solvent for the foaming oils dissolved in the furfural; we prefer to use an aliphatic hydrocarbon having from 3 to 8 carbon atoms per molecule, especially the paraffins ranging from propane through octanes. Any of the normal and branched chain paraffins ranging from propane to octane, such as propane, normal butane, normal pentane, iso-pentane, normal hexane, etc., may be employed. It is not necessary that the hydrocarbon be entirely paraffinic. We have obtained very satisfactory results with a $C_4$ hydrocarbon stream consisting essentially of normal butane and normal butenes; such a stream is readily available as the overhead from the furfural absorber employed for the recovery of butadiene and butene-2 from the $C_4$ content of the second catalytic stage effluent in the manufacture of butadiene from normal butane.

The present invention is especially applicable to furfural extractive distillation systems employed for the recovery of butadiene from normal butane, normal butene mixtures or for the recovery of normal butene (usually butene-2) from admixture with normal butane, or to a plant embodying both. Thus it is customary to make butadiene either by catalytic dehydrogenation of normal butene or by two-stage catalytic dehydrogenation of normal butane. In the first case a single extractive distillation with furfural is applied to the $C_4$ content of the effluent to recover the butadiene and butene-2 therefrom. In the case of two-stage dehydrogenation of normal butane, a furfural extractive distillation is employed between stages for separating butene-2 from normal butane and a second extractive distillation is applied in the recovery of a mixture of butadiene and butene-2 from the second stage effluent.

We have found it to be especially convenient to employ as solvent in the de-oiling process of the present invention the relatively saturated overhead product of the absorber in which the furfural is employed, since in this manner no extraneous solvent need be obtained and the solvent is thus kept in the extractive distillation system; it will appear below that the de-oiled furfural obtained in accordance with the present invention is saturated with the solvent which is thus returned to the extraction system.

In the contacting and separating zone in which the bulk of the extraction of foaming oils takes place in accordance with the present invention, conditions are so maintained that very intimate contact between the incoming hydrocarbon solvent and the furfural is obtained. There may be considerable turbulence in this zone and some agitation due to the injection of the solvent phase. A stream of the upper or solvent phase is continuously withdrawn and injected into the bottom of the zone in intimate contact with the lower furfural phase. Preferably this injected solvent is under considerable pressure so that very good contact and mixing of phases take place. The injection is preferably aided by the employment of means for jetting the solvent at high velocity in finely divided form to insure intimacy of contact and thorough distribution of the solvent through the furfural. The injected solvent droplets rise upwardly through the furfural phase and extract the oil therefrom.

Conditions in the extraction zone are such that stratification into an upper solvent phase and a lower furfural phase takes place therein. Withdrawal of these phases is carried out continuously. The withdrawn furfural phase is substantially lower in content of foaming oils than the furfural fed to the de-oiling unit, and may be returned to the absorber. In some cases it will contain some entrained solvent phase and it has been found desirable to allow it to stratify, separating the resulting phase of entrained hydrocarbon and returning it to the de-oiling unit.

A stream of the upper hydrocarbon phase is continuously passed to a fractionation zone and fractionally distilled therein to separate it into an overhead fraction consisting of hydrocarbon solvent and a bottoms fraction containing the extracted impurities. Any furfural which is present in the feed to the fractionation zone will appear in the bottoms product. The bottoms product is withdrawn and, if furfural is present in substantial amount, allowed to cool and stratify into an upper oil layer and a lower furfural layer. The oil layer is usually discarded although it might be passed to storage or treatment for the recovery of its dissolved furfural content. The furfural layer, saturated with oil, is generally returned to the de-oiling unit in order to save its furfural content.

It will be seen that an endless circulatory path of solvent phase is established including the contacting and separating zone and the outside piping and pump for passing the withdrawn solvent phase into the bottom of the contacting zone, a sidestream being continuously withdrawn from this circuit at a proper rate and passed to the fractionation zone. Preferably the rate of circulation in the endless circuit is many times the rate of withdrawal to the fractionation zone. For example, it is preferred to have a volume of recirculation at least 100 times the volume passed to the fractionation zone; in other words, the volume of the stream fed to the fractionation zone should be less than 1 per cent of the volume of the recirculated stream injected into the bottom of the contacting zone.

In some cases it may be found desirable to subject the entire withdrawn solvent phase to layer separation in a separate zone whereby the entrained furfural phase is caused to separate from the hydrocarbon phase. The resulting furfural phase and the major portion of the hydrocarbon phase may then be recirculated to the contacting zone while the balance of the hydrocarbon phase is fed to the fractionator. In this way furfural is prevented from entering the fractionator which is advantageous because loss of furfural by polymerization in the fractionator is thereby prevented.

In Fig. 1 of the drawing, a stream of lean furfural from the absorption system described below and which contains an objectionable quantity of dissolved oil is passed via line 1 to the extraction zone 2. A $C_4$ extractant stream composed either of normal butane or a mixture of normal butane and normal butenes is fed to unit 2 via line 3. The $C_4$ layer in unit 2 is continuously withdrawn via line 4 and returned at a high rate of circulation via line 5 to the bottom of unit 2 whence it passes upwardly through the furfural layer extracting the oils therefrom. Means 15 is indicated in the drawing for effecting thorough distribution of the injected solvent phase. Means 15 may take the form of the conventional rose or sparger or may comprise many jets or orifices for injecting the solvent at high speed and in very finely divided form through the furfural phase. A small sidestream of the hydrocarbon phase is continuously withdrawn from the circulation system via line 6 and passed to fractionator 7 where the $C_4$ extracting hydrocarbons are driven off overhead via line 8 whence they are condensed in condenser 9 and returned to unit 2. Column 7 operates more like a stripper in view of the great difference in boiling points between the solvent and the oils being extracted. However, column 7 may be refluxed at its top by a sidestream of the condensed overhead if desired.

The bottoms product from column 7 is a mixture of oils and furfural since the $C_4$ hydrocarbons dissolve some furfural especially where they contain butene. This bottoms product may be withdrawn via line 10, cooled and passed to a separate unit 11 where it is allowed to separate into an upper layer which is drawn off via line 12 and a lower furfural layer saturated with oil which is withdrawn via line 13 and recycled to unit 2 for recovery of its furfural content.

The furfural from which the oils have been removed in unit 2 is withdrawn via line 14 and thence returned to the extractive distillation system.

The extractive distillation unit is shown as embodying only a single absorber and associated stripper. However, it is to be understood that a single de-oiling operation of the present invention may be applied to a plurality of extractive distillation units which may operate on different hydrocarbon streams, for example, in a plant where normal butane is converted to butadiene by two-stage catalytic dehydrogenation, a furfural absorber and stripper being provided after each stage, the lean furfural from both strippers may be merged and passed to a common surge tank for recycle to the absorbers. The de-oiling system of the present invention may very conveniently operate on a sidestream of the merged lean furfural streams.

In the extractive distillation unit shown in Fig. 1, the $C_4$ hydrocarbon feed containing butene and/or butadiene and normal butane enters absorber 21 via line 22. Lean furfural is fed into the top of absorber 21 via line 23. The overhead $C_4$ residue is condensed in the usual manner and employed to provide reflux for column 21 injected via line 24. The balance of the overhead product leaves via line 25. In accordance with the present invention a sidestream of the overhead is passed via line 3 and employed for carrying out the de-oiling operation of the present invention. Provision is made in the form of line 26 for adding an extraneous hydrocarbon solvent through line 3.

The rich furfural leaving absorber 21 is fed via line 27 to stripper 28 which is refluxed in the usual manner with a portion of the overhead, the balance of the overhead being drawn off as product via line 29. The lean furfural is withdrawn via line 30, cooled in cooler 31 and passed via lines 32 and 33 to furfural surge or storage 34. A sidestream of the lean furfural is continuously passed to polymer removal unit 35 before its recycle. In accordance with the present invention a second sidestream of the recycled furfural is withdrawn via line 1 and treated in accordance with the present invention in the de-oiling unit to reduce its oil level to a figure such that the concentration of oil in the furfural in the extractive distillation system is kept from exceeding any predetermined level.

Fig. 2 portrays de-oiling unit which may be employed in place of that shown in Fig. 1. As will presently appear the arrangement shown in Fig. 2 constitutes, in some respects, an improved or a more highly refined embodiment of the same essential principles employed in Fig. 1. In Fig. 2 the entire stream of withdrawn hydrocarbon phase flowing in line 4 is passed to a separator 16 provided with baffle 17 to prevent incoming material from passing directly out in line 6. The entrained furfural phase is separated out continuously in vessel 16 and the entire separated furfural phase together with the major portion of the hydrocarbon phase is continuously withdrawn from unit 16 via line 5 and injected into the bottom of contacting unit 2 in the same manner as before. The furfural phase withdrawn from unit 2 via line 14 is passed to a separator 18 wherein any entrained hydrocarbon phase is allowed to rise and is recycled to unit 2 via line 19. The purified furfural is withdrawn from vessel 18 via line 14.

In Fig. 2, separator 11 operating on the bottoms of column 7 has been eliminated since the provision of separator 16 greatly reduces the need for separator 11. However, separator 11 may be employed in Fig. 2 if desired. In Fig. 2, the condensed overhead from column 7 is injected into the recirculated stream 5 instead of into the top of unit 2. Other differences are that the makeup hydrocarbon solvent added via line 3 is introduced to the recirculated stream injected into the bottom of unit 2 and that the impure furfural entering via line 1 is introduced to unit 2 at a point just below the interface therein.

If desired, a settling unit may be provided in line 6 in Fig. 1 for effecting separation of any entrained furfural therein, the thus separated furfural being recycled to the contacting and separating zone 2 or passed to the stream of purified furfural product returned to the absorber.

The hydrocarbon solvent recovered overhead from column 7 may be returned to the contacting and separating zone 2 in any suitable manner; in some cases it may be desired to return it directly thereto as shown in Fig. 1. In other cases it may be fed into the recirculation line 5 as shown in Fig. 2. Fresh makeup solvent may likewise be introduced to the de-oiling system in any suitable manner, for example, directly as in Fig. 1 or to the recirculation line as in Fig. 2. Similarly the oil-contaminated furfural may be introduced in many ways such as directly to zone 2 as in the drawings, or to the recirculation line 5.

*Example*

Lean furfural containing 0.33 per cent by weight of oils was fed via line 1 to a unit 2, as shown in Fig. 1 of the drawings, at the rate of 700 gal./hr. Extracted furfural containing 0.16 per cent by weight of oils was withdrawn from unit 2 via line 14 at the rate of 700 gal./hr. and returned to the surge tank 34. The reduction in volume of the furfural by the extraction process was not measurable because it was too small to be metered and because the extracted furfural picked up some $C_4$ hydrocarbons in the extraction, being saturated therewith. Oil was being passed into the extraction unit with the furfural at the rate of 2.3 gal./hr. Oil left the extraction unit in the extracted furfural at the rate of 1.1 gal./hr. Oil left the extraction unit in solution in the $C_4$ extract at the rate of 1.2 gal./hr. and appeared in the bottoms product of column 7

The $C_4$ hydrocarbon layer in the extraction unit 2 was continuously drawn off as shown and recirculated to the bottom thereof at the rate of 4500 gal./hr. A sidestream of 35 gal./hr., of which 1.2 gal. was oil, 2.3 gal. was furfural and the rest was $C_4$ hydrocarbons, was drawn off from the circulatory system via line 6 and passed to the fractionating column 7 where all of the $C_4$ hydrocarbons were driven off from the bottoms product of oil and furfural. The overhead $C_4$ hydrocarbons were condensed and recycled to the extraction unit 2 as shown in the drawing.

Fresh $C_4$ hydrocarbons were introduced continuously to the extraction unit 2 via line 3 at a rate equal to the rate at which they were being withdrawn from the unit 2 in the de-oiled furfural and in sufficient additional amount to make up for small system losses. These $C_4$ hydrocarbons were a stream of butene and butane derived from the overhead from the furfural absorber 21 used in the separation of butadiene and butene-2 from butene and butane.

From the foregoing description many advantages of the present invention will be apparent to those skilled in the art. The principal advantage is that the invention provides a simple and economical means of keeping the foaming oil concentration in the furfural in the extractive distillation system at a suitably low level. Another advantage is that the equipment required to add the de-oiling steps of the present invention to a furfural extractive distillation system is kept at a minimum and is simple and readily available. Another advantage is that the de-oiling process of the present invention may be carried out with a minimum of additional supervision. Another advantage is that the de-oiling process of the present invention may be carried out without the necessity of obtaining an extraneous solvent, the process of the present invention being readily carried out with solvent already available as overhead product from the furfural absorbers. Many other advantages of the present invention will be readily apparent to those skilled in the art.

The term "oil" as used in this specification refers to foam producing materials whose exact nature is not known with certainty, but which applicant assumes to consist of heavy hydrocarbons, esters and other related compounds.

We claim:

1. The process of removing foam-producing impurities from furfural contaminated therewith which comprises continuously introducing a stream of said contaminated furfural into a contacting and separating zone containing an upper hydrocarbon solvent phase and a lower furfural phase, continuously withdrawing a stream of said upper phase, continuously passing same to a separating zone and there causing the entrained furfural phase to separate from the hydrocarbon phase, continuously withdrawing said furfural phase and the major portion of said hydrocarbon phase in admixture and injecting same directly into the bottom portion of said zone in intimate contact with the furfural phase therein, causing continuous stratification in said zone into said phases, continuously withdrawing a stream of said lower furfural phase containing the purified furfural product of the process, continuously withdrawing the balance of said hydrocarbon phase from said last-named separating zone and passing same to a fractionation zone, fractionally distilling said last-named portion of said hydrocarbon phase in said fractionation zone to separate same into an overhead fraction of hydrocarbon solvent and a bottoms fraction containing the extracted impurities, withdrawing said bottoms fraction from said fractionator, cooling same and allowing same to stratify into an upper oil layer and a lower furfural layer, recycling said lower furfural layer to said contacting and separating zone, and recycling said overhead fraction to said contacting and separating zone.

2. In a process for removing foam-producing impurities from furfural contaminated therewith wherein said contaminated furfural is extracted with a solvent selected from the group consisting of $C_3$ to $C_8$ paraffin hydrocarbons, the improvement which comprises introducing a stream of said contaminated furfural into a first contacting and separating zone containing an upper phase of said hydrocarbon solvent and a lower furfural phase, continuously withdrawing a stream of said upper phase, continuously passing said withdrawn stream to a second separating zone without any intermediate treatment and there causing entrained furfural phase to separate from a hydrocarbon phase, continuously withdrawing said furfural phase and the major portion of said hydrocarbon phase in admixture from said second zone and injecting the same directly and without any additional treatment into the bottom portion of said first zone in intimate contact with the furfural phase therein, causing continuous stratification in said first zone to form said hydrocarbon solvent and said furfural phases, continuously withdrawing a stream of said lower furfural phase from said first zone which contains the purified furfural product of the process, continuously withdrawing the balance of said hydrocarbon phase from said second zone and passing same to a fractionation zone, fractionally distilling said last-named portion of said hydrocarbon phase in said fractionation zone to separate same into an overhead fraction of hydrocarbon solvent and a bottoms fraction containing the extracted purities, withdrawing said bottoms fraction from said fractionator, cooling and allowing same to stratify into an upper oil layer and a lower furfural layer, recycling said lower furfural layer to said first contacting and separating zone, and recycling said overhead fraction to said first contacting and separating zone.

3. The process for removing foam-producing impurities from furfural contaminated therewith which comprises continuously introducing said contaminated furfural into a contacting and separating zone containing an upper hydrocarbon phase and a lower furfural phase at a point within the lower portion of said upper phase, continuously withdrawing a first stream of said upper phase from the upper portion of said upper phase, continuously passing said withdrawn stream of said upper phase without any intermediate treatment into the lowermost portion of said lower furfural phase and causing it to pass upwardly therethrough as a dispersed phase in intimate contact with said lower furfural phase, causing continuous stratification in said zone of said furfural and said hydrocarbon solvent into said upper hydrocarbon solvent and said lower furfural phases, continuously withdrawing a stream of said lower furfural phase from said lower furfural phase at a point mid-way between its uppermost and lowermost portions to thereby produce the purified furfural product of the process, continuously withdrawing a second stream of said upper hydrocarbon phase from the uppermost portion of said upper hydrocarbon phase and feeding same to a fractionation zone, fractionally distilling said second stream from said upper phase in said fractionation zone to separate same into an overhead fraction of hydrocarbon solvent and a bottoms fraction containing the extracted foam-producing impurities, and recycling said overhead fraction to said contacting and separating zone wherein it is injected at a point above the said upper hydrocarbon phase contained therein.

4. The process for removing foam-producing impurities from furfural contaminated therewith, which comprises introducing said contaminated furfural into a contacting and separating zone containing an upper hydrocarbon phase and a lower furfural phase at a point within the lower portion of said upper phase, continuously withdrawing a first stream of said upper phase from the upper portion of said upper phase at a rate 6.5 times the rate at which said furfural is introduced into said contacting and said separating zone, continuously passing said withdrawn stream of said upper phase without any intermediate treatment into the lowermost portion of said lower furfural phase and causing it to pass upwardly therethrough as a dispersed phase in intimate contact with said lower furfural phase, causing continuous stratification in said zone of said furfural and said hydrocarbon solvent into said upper hydrocarbon solvent and said lower furfural phases, continuously withdrawing a stream of said lower furfural phase from said lower furfural phase at a point mid-way between its uppermost and lowermost portions to thereby produce the purified furfural product of the process, continuously withdrawing a second stream of said upper hydrocarbon phase from the uppermost portion of said contacting and separating zone at a rate of 0.05 times the rate at which said contaminated furfural is fed into said contacting and separating zone, feeding said second stream from said upper phase to a fractionation zone, fractionally distilling said second stream from said upper phase in said fractionation zone to separate same into an overhead fraction of hydrocarbon solvent and a bottoms fraction containing the extracted foam-producing impurities, and recycling said overhead fraction to said contacting and separating zone wherein it is injected at a point above the said upper hydrocarbon phase contained therein.

5. The process of removing foam-producing impurities from furfural contaminated therewith which comprises continuously introducing a stream of said contaminated furfural into a contacting and separating zone containing an upper hydrocarbon solvent phase and a lower furfural phase, continuously withdrawing a stream of said upper phase and injecting it into the bottom portion of said zone and causing it to pass upwardly therethrough as a dispersed phase in intimate contact with the furfural phase therein, causing continuous stratification in said zone into said phases, continuously withdrawing a stream of said lower furfural phase containing the purified furfural product of the process, continuously withdrawing a stream of said upper phase and feeding same to a fractionation zone, fractionally distilling said last-named stream in said fractionation zone to separate same into an overhead fraction of hydrocarbon solvent and a bottoms fraction containing the extracted purities, recycling said overhead fraction to said contacting and separating zone, withdrawing said bottoms fraction from said fractionator, cooling same and allowing same to stratify into an upper oil layer and a lower furfural layer and recycling last-said lower furfural layer to said contacting and separating zone.

ROBERT G. BOATRIGHT, Jr.
MYRON O. KILPATRICK.
WILLIAM S. DERRICK.

REFERENCES CITED

The following references are of record in the file of this patent:

UNITED STATES PATENTS

| Number | Name | Date |
|---|---|---|
| 1,684,489 | Halloran | Sept. 18, 1928 |
| 2,079,885 | Voorhees | May 11, 1937 |
| 2,151,529 | Roberts | Mar. 21, 1939 |
| 2,151,592 | Ferris | Mar. 21, 1939 |
| 2,186,298 | Kiersted | Jan. 9, 1940 |
| 2,350,584 | Buell et al. | June 6, 1944 |
| 2,350,609 | Hackmuth | June 6, 1944 |
| 2,388,834 | Douslin | Nov. 13, 1945 |
| 2,414,402 | Thodos et al. | Jan. 14, 1947 |

FOREIGN PATENTS

| Number | Country | Date |
|---|---|---|
| 243,113 | Great Britain | June 15, 1924 |